G. H. Bristol,
Windlass Water Elevator,
N°. 80,447.           Patented July 28, 1868.
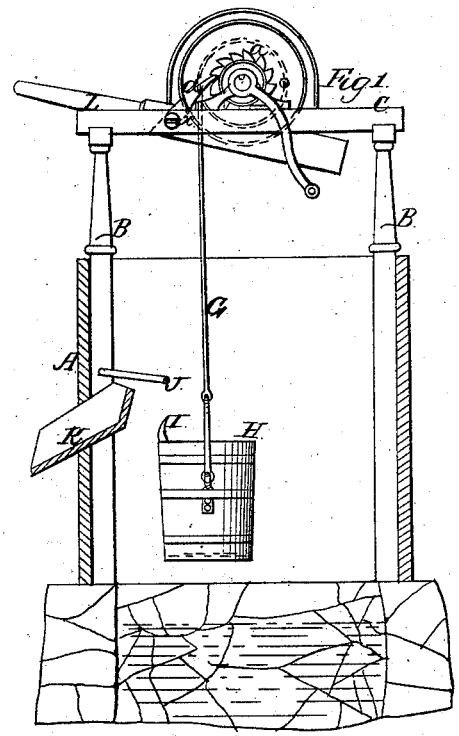
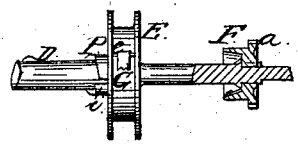
Witnesses.
V. D. Stockbridge
A. M. Marr
Inventor.
G. H. Bristol
per
Alexander & G. Mason
Attys

United States Patent Office.

G. H. BRISTOL, OF ROMEO, MICHIGAN.

Letters Patent No. 80,447, dated July 28, 1868.

WATER-ELEVATOR.

The Schedule referred to in these Letters Patent and making part of the same.

TO ALL WHOM IT MAY CONCERN:

Be it known that I, G. H. BRISTOL, of Romeo, in the county of Macomb, and in the State of Michigan, have invented certain new and useful Improvements in Water-Elevators; and do hereby declare that the following is a full, clear, and exact description thereof, reference being had to the accompanying drawings, and to the letters of reference marked thereon.

In the annexed drawings, making part of this specification, A represents the curb or boxing around the mouth of a well.

B B represent the corner-posts of this curb, which project up, and which are provided at their upper ends with the cross-pieces C. Lying crosswise of and having bearings upon these cross-pieces C, is a crank-shaft, D. A portion of this shaft is made conical or has a swell upon it, and upon this swell two lugs, $i\ i$, only one of which is here seen, but which are on opposite sides of the shaft.

E represents a belt-spool, which passes over the shaft D, and is secured upon its swell. This spool has a flange around its eye, marked P, and the edge of this flange is bevelled or formed like the thread of a screw. Slots are formed in the flange P, which receive the lugs $i\ i$. When the spool has been passed beyond the lugs $i\ i$, and is turned partially around, the lugs fitting against the bevelled edge of the flange force the spool tightly upon the swell of the shaft, so that it is securely and permanently fastened there. This tightening process is made to take place while there is strain upon the belt, so that the more strain is put upon it, the tighter the spool is secured. This spool may, of course, be removed by reversing it upon the shaft.

G represents a belt of strap metal, which is fastened at one end to the bail of the bucket H, and at its other to the periphery of the spool E. The belt has an eye or loop formed at the spool-end of it, and a pin passing through the two flanges on each side of the periphery, and through this eye, secures it permanently to the said spool. The pin $e$, which fastens this belt to the spool, is embedded in a groove in the periphery of said spool, so that the belt will wind around a plane surface.

F represents a friction and ratchet-wheel combined, and which are secured upon the shaft D. Beneath the friction-wheel F, and pivoted to one of the cross-pieces C, is a lever, L. This lever is provided with a stationary pawl, $d$. When the outer end of this lever is raised, the outer end of the pawl catches into the teeth of the ratchet-wheel $a$ and prevents the shaft D from revolving, but when the outer end of the lever is depressed the pawl $d$ leaves the ratchet-wheel, and one end of said lever bears against the friction-wheel F, so as to regulate its motion. By bearing upon this lever with any desired degree of pressure, the bucket H may be lowered into the well freely and easily, or it may be stopped entirely at any desired point.

K represents a spout, which leads from the curb. Over this spout, on the inside of the curb, is hinged a bail, J, which may be raised by force, and which drops of its own accord, or by its own gravity. Upon one side of the upper edge of the bucket is a hook, I. When the bucket is raised above the spout, as it passes, the hook I catches in the bail J, and said bail causes the bucket to turn to a horizontal position and discharge its water in the spout. When the bucket descends again, the bail J drops to a horizontal position, so as to catch the hook of the bucket when it is drawn up again.

The bottom of the bucket is made of metal, and is provided with a valve, which allows said bucket to be filled from the bottom. The valve allows water to pass into but not out of the bucket in drawing water.

Having thus fully described my invention, what I claim as new, and desire to secure by Letters Patent, is—

The combination of the lever L, its pawl $d$, wheel F, spool E, shaft D, bail J, and the bucket and curb, when all are constructed, arranged, and used as specified.

In testimony that I claim the foregoing, I have hereunto set my hand, this 18th day of February, 1868.

G. H. BRISTOL.

Witnesses:
C. F. MALLARY,
T. A. SMITH.